Figure 3:
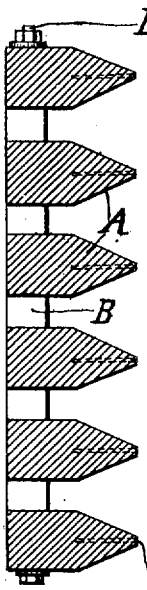

No. 12,818. REISSUED JUNE 23, 1908.

E. A. MANNY.

CATTLE GUARD.

APPLICATION FILED MAR. 26, 1908.

2 SHEETS—SHEET 1.

Witnesses:

C. Facompréz

W. S. Babcock

Emilien Alfred Manny

Inventor,

By Marion & Marion

Attorneys

THE NORRIS PETERS CO., WASHINGTON, D. C.

No. 12,818. REISSUED JUNE 23, 1908.

E. A. MANNY.

CATTLE GUARD.

APPLICATION FILED MAR. 26, 1908.

2 SHEETS—SHEET 2.

Witnesses:

C. Facomprez

W. S. Babcock

Emilien Alfred Manny Inventor,

By Marion & Marion

Attorneys

THE MORRIS PETERS CO., WASHINGTON, D. C.

UNITED STATES PATENT OFFICE.

EMILIEN ALFRED MANNY, OF BEAUHARNOIS, QUEBEC, CANADA.

CATTLE-GUARD.

No. 12,818. Specification of Reissued Letters Patent. Reissued June 23, 1908.

Original No. 872,951, dated December 3, 1907, Serial No. 363,112. Application for reissue filed March 26, 1908. Serial No. 423,490.

*To all whom it may concern:*

Be it known that I, EMILIEN ALFRED MANNY, a subject of the King of Great Britain, residing at Beauharnois, county of Beauharnois, in the Province of Quebec, Canada, have invented certain new and useful Improvements in Cattle-Guards; and I do hereby declare that the following is a full, clear, and exact description of the invention, such as will enable others skilled in the art to which it appertains to make and use the same.

My invention relates to cattle guards for railway tracks.

The object of my invention is to provide a simply constructed guard, so arranged that an animal may easily walk from between the rails or crosswise of the track and guard, but will have difficulty in walking lengthwise of the track and guard while between the rails.

A further object is to provide a guard constructed of wood with reinforced points; and, my invention consists of the construction, combination and arrangement of parts, as herein illustrated, described and claimed.

Figure 1:
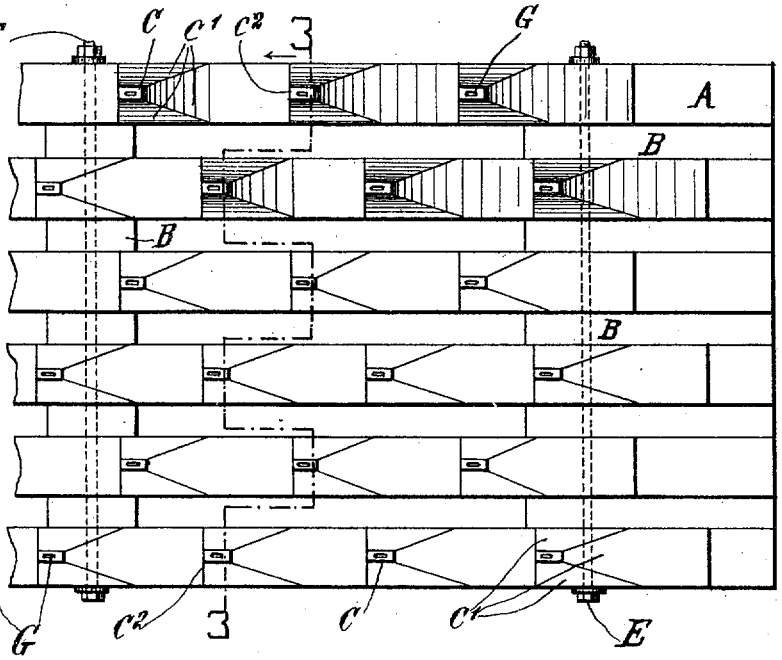
Figure 2:
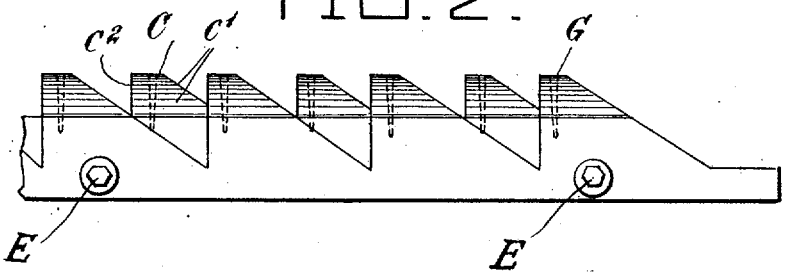
Figure 5:
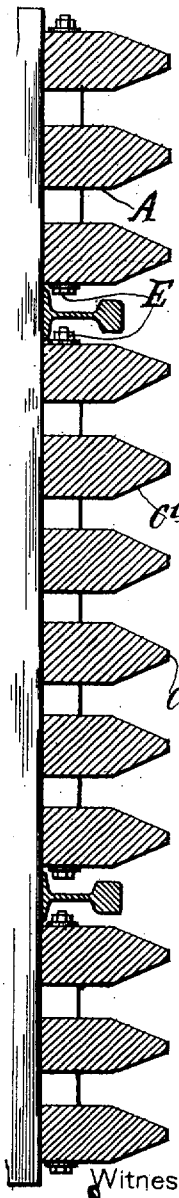
Figure 4:
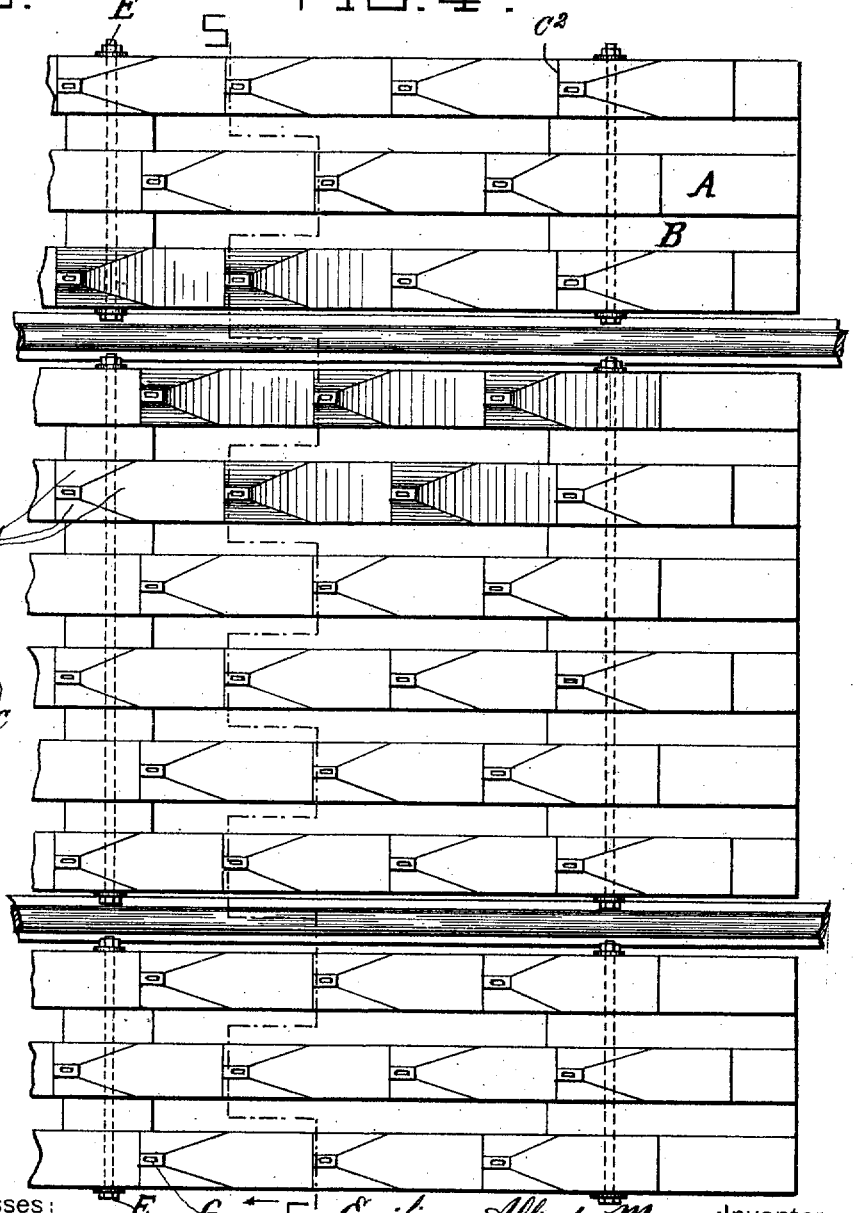

In the accompanying drawings, forming part of this application, I have illustrated one form of embodiment of my invention, in which drawings similar reference characters designate corresponding parts, and in which:

Figure 1 is a plan view of the guard separate from the track; Fig. 2 is a side elevation of Fig. 1; Fig. 3 is a cross section on line 3—3 of Fig. 1, looking in the direction of the arrow; Fig. 4 is a plan view, showing the cattle guard applied to the rails; and, Fig. 5 is a cross section on line 5—5 of Fig. 4.

Referring to the drawings, the letters A designate wooden strips, between which are disposed the space blocks B, the space blocks and strips being secured together as by means of the bolts E, so that a unitary structure is formed.

The upper edges of the strips A are cut away to form teeth C, each tooth being formed with three inclined surfaces $c'$; two short inclined surfaces, each slanting toward the inner face of one of the rails of the track, and a third and longer inclined surface slanting lengthwise of the track, or at substantially right angles to the first inclined surface. Each of the teeth C is provided with a flat top $c'$, and with one vertical side $c^2$.

To reinforce the teeth C, a metallic member G is driven vertically through the teeth to prevent their splitting.

In applying the guard, a number of the strips A are placed parallel to one another, with the teeth E in staggered relation, spaced apart by the blocks B, and then securely bound together by the bolts E, which are passed through the strips and the blocks, thus forming a complete guard. The guard so formed is placed between the rails of the track, so that the strips A run substantially parallel with the rails. By placing the strips A parallel with the rails, it will be noted that the short inclined surfaces $c$ of the teeth C slant toward the rails, while the long inclined surface of one tooth, terminating adjacent the vertical face $c^2$ of the next tooth, slants lengthwise of the track. It necessarily follows that when an animal enters between the rails and mounts the guard, it will be practically impossible for it to move lengthwise of the track, because its feet will strike on the short inclined faces and be forced sidewise toward the rails. When forced to the side, the feet will meet a reversely inclined surface, and there is no support. Consequently, after the first step or two, the animal turns to cross the track. This it may easily do, its feet striking on the long inclined surface $c$, and being held against sliding by the adjacent vertical side $c^2$.

Having thus fully described my invention, what I claim as new, and desire to secure by Letters Patent, is:—

1. In a cattle guard, the combination comprising a plurality of strips provided with teeth, each having three inclined surfaces and a vertical wall, means for spacing the strips apart, and means for binding the strips and spacing means together to form a unitary structure.

2. In a cattle guard, the combination comprising a plurality of strips provided with teeth, each having three inclined surfaces, a vertical wall and a flat top, spacing means disposed between the strips, and means for binding the strips and the spacing means together to form a unitary structure.

3. In a cattle guard, the combination comprising a plurality of continuous wood strips provided with integral teeth, each having a plurality of inclined sides and a vertical wall, means for spacing the strips apart, and means for binding the strips and spacing means into a unitary structure.

In witness whereof I have hereunto set my hand in the presence of two witnesses.

EMILIEN ALFRED MANNY.

Witnesses:
Jos. J. Bouchard,
J. M. Lambert.